May 22, 1928.  
F. S. BARKS  
1,670,433  
ROLLER BEARING  
Filed July 24, 1925
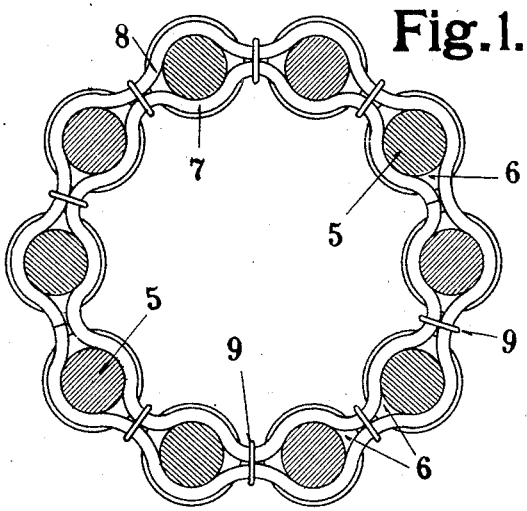
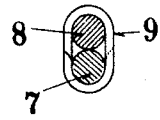
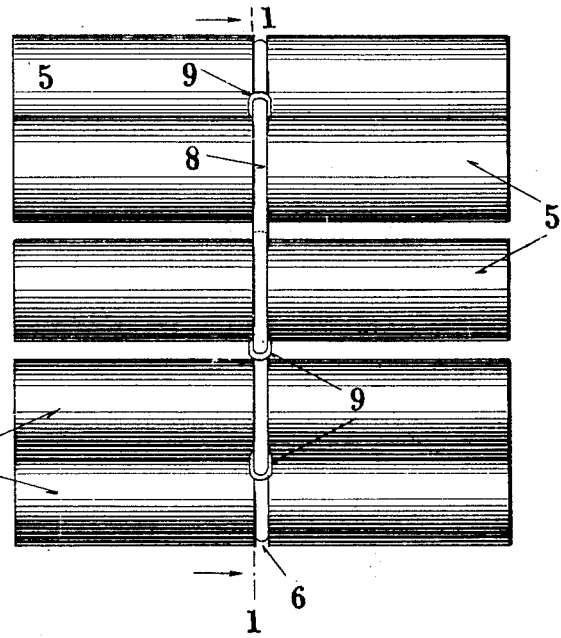
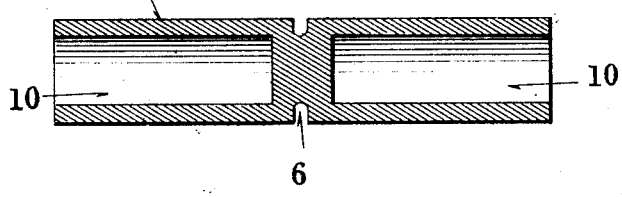
INVENTOR  
FRANK. S. BARKS  
BY *E. E. Huffman*  
ATTORNEY Patented May 22, 1928.

1,670,433

UNITED STATES PATENT OFFICE.

FRANK S. BARKS, OF ST. LOUIS, MISSOURI, ASSIGNOR TO LINCOLN STEEL & FORGE COMPANY, OF ST. LOUIS, MISSOURI, A CORPORATION OF MISSOURI.

ROLLER BEARING.

Application filed July 24, 1925. Serial No. 45,800.

My invention relates to a roller bearing and particularly to means for holding the rollers in proper relation to each other, not only when situated in the bearing box and around the axle but also when removed therefrom, thus insuring proper functioning and long life to the bearing and enabling it to be readily assembled.

In the accompanying drawings, which illustrate one form of bearing made in accordance with my invention, Figure 1 is a section taken on the line 1—1 of Figure 2; Figure 2 is a side view; Figure 3 is an enlarged section showing the means for fastening the two retaining rings together; and Figure 4 is a longitudinal section through one of the rollers.

The bearing is composed of a number of rollers 5 each having formed in its periphery a central annular groove 6. Situated in the grooves 6 are inner and outer retaining rings 7 and 8 respectively. Each of these rings consists of a piece of tempered steel spring wire and is of sinuous shape (as shown in Figure 1) so as to form alternate concave and convex portions. The concave portions provide bearings for the reduced parts of the rollers resulting from the grooves 6, and the convex portions project between the rollers and form spacing means to maintain the rollers equidistant from each other throughout the circumference of the bearing. The convex parts of the two rings are preferably so proportioned that they will come in contact, or nearly in contact, with each other, as shown in Figure 1, and the two rings are connected at these points. One method of making this connection, as shown in detail in Figure 3, is by means of a clinched staple 9. This connection 9 may be omitted at the points where the ends of the wires forming the rings meet, said points being preferably arranged diametrically opposite each other, as shown in Figure 1. Formed in each end of each of the rollers 5 is a recess 10 which not only lightens the roller but also forms a lubricant chamber to hold a reserve supply of grease.

The rollers 5 often become slightly tapered through wear. When such a tapered roller passes the load carrying point of the axle it does not remain parallel to the axle but assumes a slight angular position with respect thereto. This tends to distort the spacing rings, but since I make these rings of spring material they return to original shape when the tapered roller passes load carrying position and thereby permanent distortion, which would result in other rollers being brought in load carrying position at an angle to the axle axis, is avoided.

The use of the centrally located resilient caging device not only prevents injury to the device from worn rollers, as above pointed out, but also enables it to withstand ordinary rough usage to which it is necessarily subjected in handling while out of the bearing box.

The use of the wire rings also enables me to form the grooves 6 with rounded bottoms, thus avoiding square shoulders which would weaken the rollers.

Having fully described my invention, what I claim as new and desire to secure by Letters Patent of the United States is:

1. In a device of the class described, the combination with a plurality of cylindrical rollers, of a retaining member engaging with said rollers at points intermediate of their ends and holding them in annular form, said member having lateral resilience and functioning both to space the rollers apart and to prevent their movement toward or away from the center of the bearing, the lateral resilience of said member tending to hold the rollers with their axes in parallel relation.

2. In a device of the class described, the combination with a plurality of cylindrical rollers, of a retaining member comprising a pair of sinuous rings connected together at a plurality of points and engaging with said rollers at points intermediate of their ends, said member having lateral resilience and functioning both to space the rollers apart and to prevent their movement toward or away from the center of the bearing, the lateral resilience of said member tending to hold the rollers with their axes in parallel relation.

In testimony whereof, I have hereunto set my hand this the 21st day of July, 1925.

FRANK S. BARKS.